No. 870,581. PATENTED NOV. 12, 1907.
J. E. OSMER.
COMBINATION WHEEL AND TIRE GAGE.
APPLICATION FILED MAY 7, 1906.

Witnesses:
A. W. Fenstermaker
T. W. Williams

Inventor,
John E. Osmer.
By Glenn S. Noble
Atty.

UNITED STATES PATENT OFFICE.

JOHN E. OSMER, OF CHICAGO, ILLINOIS.

COMBINATION WHEEL AND TIRE GAGE.

No. 870,581.  Specification of Letters Patent.  Patented Nov. 12, 1907.

Application filed May 7, 1906. Serial No. 315,507.

*To all whom it may concern:*

Be it known that I, JOHN E. OSMER, a citizen of the United States, residing at Chicago, in the county of Cook and State of Illinois, have invented certain new and useful Improvements in Combination Wheel and Tire Gages, of which the following is a specification.

This invention relates more particularly to gages or devices adapted to be used for determining various measurements, defects or necessary changes to be made in connection with railway car, locomotive or other flanged wheels. Its objects are to produce an accurate and convenient measuring instrument for measuring or determining a number of measurements or tests in connection with the rims and flanges of such wheels.

It is illustrated in the accompanying drawings in which

Figure 1:
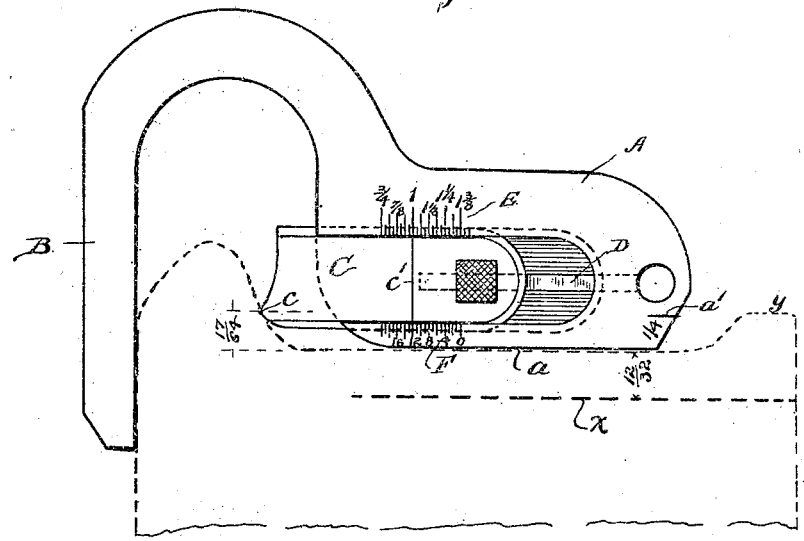
Figure 2:
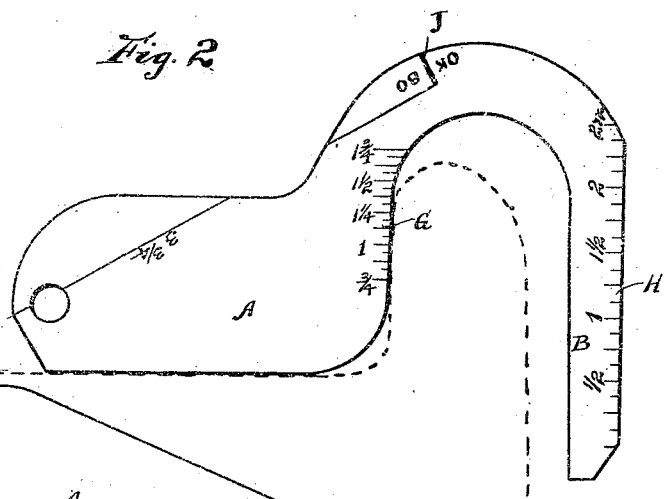
Figure 3:
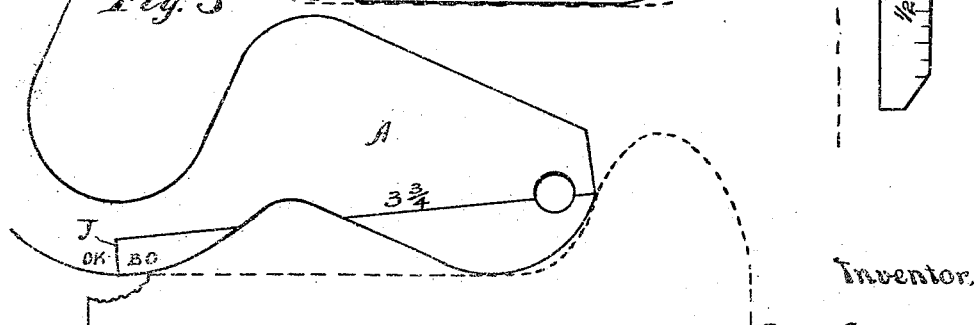

Figure 1 represents a preferred form of my improved gage shown as applied to a worn rim and flange for determining certain measurements; Fig. 2 represents a reverse side of the gage, showing additional graduations and lines for making other measurements; and Fig. 3 is also a view of the reverse side, showing its application to a wheel for determining the extent of chipped rims.

As illustrated in these drawings, this gage is shown with scales and indicating marks corresponding in the main with the present rules of the Master Car Builders' Association of the United States; but, of course, this device may be provided with any desired scales or indicating marks.

The preferred form of the device comprises a handle-portion A having a hook-like extension B which, for convenience, will be called a "hook." One of the necessary measurements to be determined in connection with flanged wheels is the thickness of the flange, which, for convenience, is determined at a point 17/64 of an inch above the tread of the wheel. Heretofore no instrument has been provided for accurately determining this measurement. By means of my improved gage, this measurement may be accurately determined as shown in Fig. 1.

The handle portion A is provided with a slide C which is preferably dovetailed into the handle, and is held in adjusted position by means of a spring D in the bottom of the groove in which the slide is secured and which presses up against said slide. This slide is provided with a projecting point c which is 17/64 of an inch above the lower, straight edge a of the body of the gage. Now, when the gage is adjusted to the wheel so that the lower edge a rests on the tread of the wheel and the hook B is brought into engagement with the face of the wheel, then the thickness of the flange may be determined by moving the slide C out until the point c engages with the flange. This will give the exact thickness, and in order to determine the thickness I have provided a scale E on the body of the gage along the upper edge of the slot for the slide C. An indicating line c' on the slide indicates the desired thickness of the flange. For instance, as shown in Fig. 1, the flange measures 1 inch in thickness which is below the standard required for railway wheels. This standard requires that the flange at this point should be 1¾ inches thick. Consequently, such a wheel as indicated in dotted lines in this figure would be condemned, and it would then be necessary to turn up the wheel in order to bring it to the proper shape. To do so, the rim must necessarily be turned off for a sufficient depth in order to secure enough stock to make the flange of the desired thickness. The depth of this cut will be in a certain manner indirectly in proportion to the thickness of the flange; and I have determined, by trial and measurement, the relative amount of cut which must be taken for different thicknesses of worn flanges in order to bring the wheel to its true or proper shape. These measurements are shown on the body of the gage at F just below the slot for the slide, and are so arranged that, when the slide is moved to determine the thickness of the flange, the indicating line c' will also indicate the cut to be taken on the tread of the wheel. As shown in the drawing, the thickness of the flange being indicated as 1 inch, the necessary cut to be taken to restore the flange to its proper condition is indicated at the bottom of the slide as 12/32 and the dotted line x indicates where this measurement is to be taken and also indicates the new tread of the wheel after it has been turned to the proper shape. This figure also indicates another measurement which the gage is adapted to determine. When the tread becomes grooved, leaving a second flange or raise as indicated at y, it is also necessary to restore the wheel to proper condition. The extreme depth of such groove before the wheel is condemned has been fixed at ¼ of an inch. Accordingly, I have provided an indicating mark a', as shown at the right-hand end of the gage for determining this measurement.

It will be observed that the scales E and F might, in some instances, be placed on the slide and indicating marks or pointers made on the body of the gage, and such scales might be changed in full according to the nature of the wheels or flanges which are to be measured. As shown in Fig. 2, the opposite or reverse side of the gage is provided with a scale G which is adapted to measure the height of the vertical wear of the tire flange, and also for showing the height of the flange. This is clearly indicated as the gage is shown in connection with a wheel tire shown in dotted outline. The scale H on this side of the gage is used for measuring flat spots on the tread of the rim, or for making any other measurements for which it would be convenient. The reverse side is also provided with an indicating line J for determining the safe or unsafe condition of a broken wheel tread.

The position of the gage, in connection with a chipped rim, is shown in Fig. 3. According to the accepted standards, if the chipping does not extend past the line J or is only on the side of the line marked "O. K.", then the wheel would be considered safe. However, if the chip extends beyond the line to the side marked "B. O.", then the wheel would be considered in bad order and would be condemned.

Having thus described my invention, what I claim and desire to secure by Letters Patent is:

1. The combination with a gage adapted to fit on the rim of a wheel and provided with a hook to engage with the face of the wheel, of a slidable indicating member for measuring the thickness of the flange at a given distance from the face of the wheel.

2. In a gage for measuring the thickness of wheel flanges, the combination of a body portion having a straight edge adapted to fit on the wheel tread, an extension or hook from said body portion adapted to engage with the outer face of the wheel adjacent to the flange, a slide having a projection adapted to engage with the flange at the point where the measurement is to be taken, and a scale for indicating the thickness of the flange when the slide is in engagement therewith.

3. A measuring instrument for measuring the thickness of wheel flanges, comprising a body portion A, a hook B, a slide C, a scale on said body portion, an indicating line on said slide, and a spring for holding said slide in adjusted position.

4. In a wheel and tire gage, the combination of a body portion provided with a hook, a slide in said body portion having a pointed end and adapted to coact with said hook in taking measurements, and marks on said slide adapted to register with scales on said body portion for indicating the thickness of the flange and for indicating the amount of cut to be taken off from the wheel for a given thickness of flange, substantially as described.

JOHN E. OSMER.

Witnesses:
C. W. FANSTEMAKER,
C. H. CRAWFORD.